2 Sheets—Sheet 1.

S. J. ADAMS.

Molding Apparatus.

No. 9,573. Reissued Feb. 15, 1881.

Witnesses.

P. G. May

Clarence Burleigh

Inventor.

S. Jarvis Adams by James L. Kay

Attorney

2 Sheets—Sheet 2.

S. J. ADAMS.

Molding Apparatus.

No. 9,573. Reissued Feb. 15, 1881.

Witnesses.

F. G. Hay

Charles Burleigh

Inventor.

S. Jarvis Adams by James L. Hay

Attorney

UNITED STATES PATENT OFFICE.

S. JARVIS ADAMS, OF PITTSBURG, PENNSYLVANIA.

MOLDING APPARATUS.

SPECIFICATION forming part of Reissued Letters Patent No. 9,573, dated February 15, 1881.

Original No. 235,191, dated December 7, 1880. Application for reissue filed January 10, 1881.

*To all whom it may concern:*

Be it known that I, S. JARVIS ADAMS, of Pittsburg, in the county of Allegheny and State of Pennsylvania, have invented certain new and useful Improvements in Molding Apparatus; and I do hereby declare that the following is a full, clear, and exact description thereof, reference being had to the accompanying drawings, and to the letters of reference marked thereon, which form a part of this specification, in which—

Figure 1:
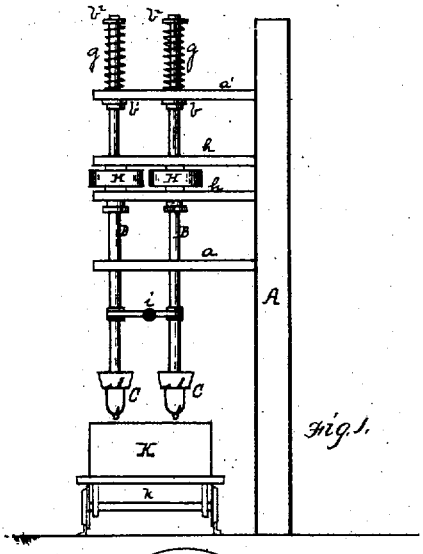
Figure 2:
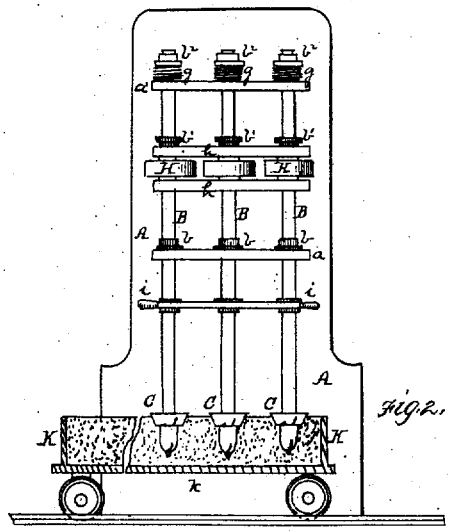
Figure 3:
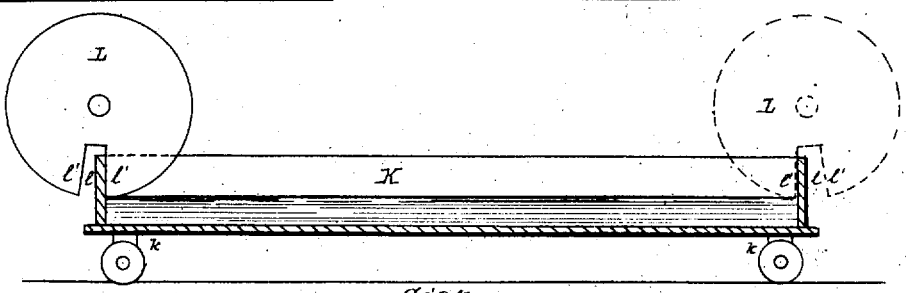
Figure 4:
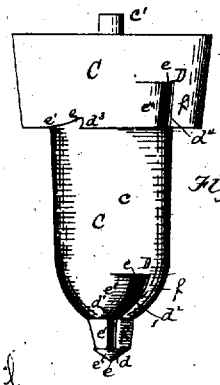
Figure 11:
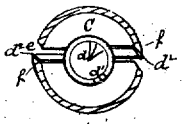
Figure 5:
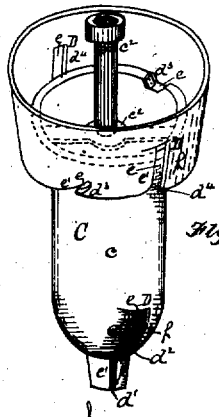
Figure 6:
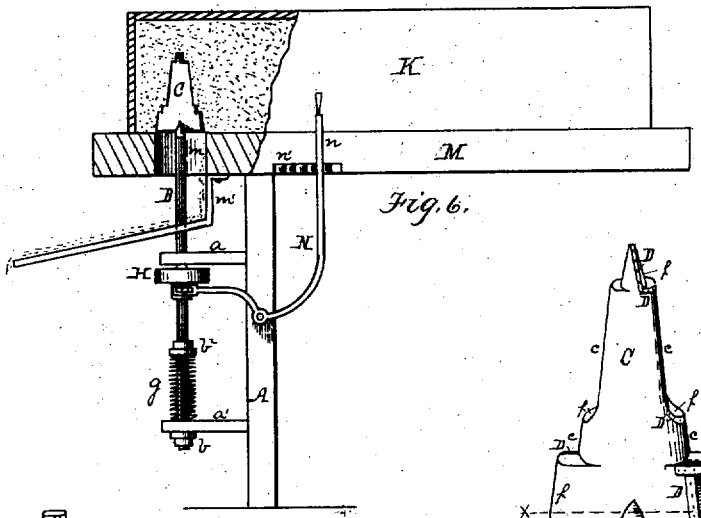
Figure 7:
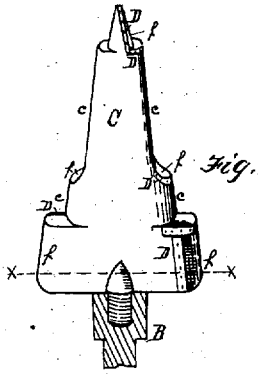
Figure 10:
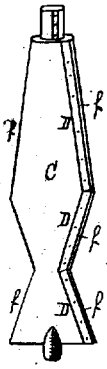
Figure 8:
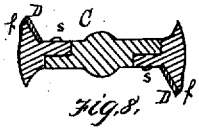
Figure 9:
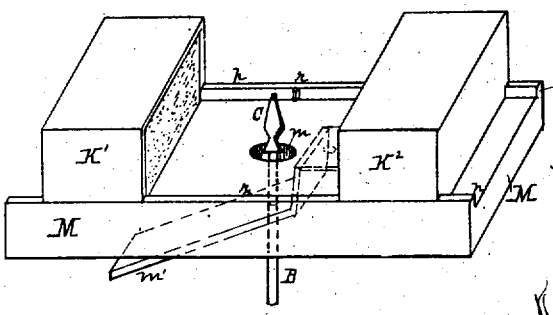

Figure 1 is a side view of the apparatus employed in practicing my invention. Fig. 2 is a face view of the same. Fig. 3 illustrates the method of packing the sand. Figs. 4 and 5 are views of the revolving pattern. Fig. 6 shows the apparatus employed where the mold is formed from below. Figs. 7 and 8 are views of the pattern employed where the mold is formed from below. Figs. 9 and 10 show the apparatus and pattern employed where the mold is formed from the side. Fig. 11 is a cross-section of the hollow pattern.

Like letters of reference indicate like parts in each.

My invention relates to the formation of molds in sand for making castings of iron, steel, or other metals, and its special object is to provide apparatus whereby cylindrical molds which are perfect in shape may be rapidly and accurately formed.

My invention consists, first, in certain improvements in revolving patterns or cutters for forming molds in a solid body of packed sand, whereby the cutter is adapted to cut its way into the sand and sleek or polish the surface of the mold after so forming it; second, in forming the revolving pattern hollow, for the reception of the sand removed; and, lastly, in other improvements in the construction of the cutters and the apparatus employed in carrying out my invention.

To enable others skilled in the art to practice my invention, I will describe it more fully.

My invention is illustrated as applied in different ways in the several figures, the revolving patterns being illustrated as entering the sand from above, as in Figs. 1 and 2; from below, as in Fig. 6, and at the side, as in Fig. 9. In Figs. 1 and 2 the revolving patterns are mounted above the flask and adapted to be drawn down, so as to penetrate the sand and form the mold therein.

The apparatus is supported on a suitable standard or support, A, provided with two or more horizontal arms or plates $a$ $a'$, in which the perpendicular shafts B, carrying the rotating or revolving patterns C, are mounted, the shafts passing through bearings in or supported by the arms or plates $a$ $a'$. The revolving patterns are generally arranged in a nest—say of six patterns, as shown—each pattern being secured to the base of one of the shafts B extending up through the plates $a$ $a'$.

The patterns are made corresponding in shape to the article to be cast, the patterns shown being suited for the formation of pipe-ball molds, and when entering the sand from above are formed hollow, so that the sand can pass into the pattern as it cuts its way into the body of sand.

The pattern is provided with knives or cutters D at all points where it has to cut into the sand in forming the mold, there being the entering-knife $d$ at the base and the knife $d'$ above to form the core-print, the curved knife $d^2$ to form the curve or taper at the base of the mold, and the knives or cutters $d^3$ and $d^4$ to form the cope-print at the top of the mold, the knife $d^3$ serving to cut out the cope-depression, and the knife $d^4$ to taper off the sides thereof. In front of each knife is an opening, $e$, leading into the interior of the pattern, the sand cut off by the knives passing through these openings into the hollow pattern. The surface of the pattern in front of the knives is slightly reduced and curves off into the openings $e$, as at $e'$, to enable the knives to cut away the sand. Back of the knives the pattern is made full size or slightly enlarged to form a slicker or smoother, as at $f$, which imparts to the mold a smooth and even surface, polishing over any irregularity left by the knives.

Where the pattern is perpendicular, or nearly so, as at $g$, no knives are necessary, and the pattern is made slightly larger in diameter than the upper end of the knife $d^2$ below, so that it will compact and harden that portion of the mold by its revolution, insuring a perfectly cylindrical mold.

The pattern is provided with the brace $e'$, extending across the hollow interior, to which brace a rod, $c^2$, is rigidly attached, and, extending up from the center of the pattern, is screwed or otherwise removably secured at the base of the shaft B.

The shafts B have a longitudinal as well as a rotary motion in their bearings to permit the patterns to be drawn down into the sand, and their longitudinal movement is limited by means of stops or sleeves $b$ $b'$, attached thereto by set-screws, so that the movement of the shafts may be regulated to the length of pattern used therewith.

The shafts B are provided with spiral or other springs $g$, confined between the upper horizontal plate, $a'$, and tops $b^2$ of the shafts, by means of which the patterns are held up clear of the course of the flask when not in use, and retracted after forming a mold.

Near the base of the shaft are arranged suitable handles $i$, for drawing the nest of revolving patterns down to form the molds.

A rotary motion is imparted to the shafts B carrying the patterns by means of pulleys H, supported on the horizontal frame $h$, extending from the standard A and keyed in longitudinal slots in the shafts, so as to permit the shafts to slide through them when the patterns are drawn down, as above described. The pulleys are rotated by belting extending from any suitable power-connections.

I prefer to have the sand in which the molds are formed packed in long flasks, as less time is consumed in feeding to the patterns, and as the sand is packed solid flasks of about twenty feet in length can be employed to advantage.

The flasks can be rammed, jarred, or packed in any known manner, and as no patterns are used in the flasks a more solidly and uniformly packed body of sand can be obtained. The most rapid and efficient method of packing the long flasks that I have found is by rolling, as shown. The flask K is placed on a suitable car or carriage, $k$, and this car brought under a heavy roller, L. The roller is either mounted and rotated in stationary housings and the flask passed back and forth under it, while the sand is gradually fed thereto until it is packed full of sand, or the flask is held stationary and the roller passed back and forth over it as the sand is fed thereto.

Across the face of the roller L is formed the recess $l$, which extends a sufficient distance into the roller to allow the end boards of the flask to fit therein, forming the corners or edges $l'$ along the recess, which fit close into the corners of the flask and pack the sand therein. The roller L is made of such diameter that one revolution will be made as it passes from one end of the flask to the other, the recess $l$ fitting over one end board, and upon the rotation of the roller fitting over the opposite end board, as shown in dotted lines. I am by this means enabled to pack the sand uniformly and tightly, not only in the body of the flask, but in the ends thereof.

The packed flask K is brought under the revolving patterns either on a stationary table or by means of the car or carriage $k$, the latter being preferred where long flasks are used, as the flask can be moved along after one set of molds are made until they are formed the entire length of the flask.

In forming molds by the mechanism above described, where the patterns are drawn down from above to cut the molds in solid sand, the patterns are rotated at a speed of about two hundred revolutions per minute through the pulleys H. The flask containing the solid body of packed sand is then brought under the patterns and the patterns drawn down by the handles $i$ until they come in contact with the sand. As the patterns are drawn down farther the core-print cutters $d$ $d'$ penetrate or cut their way into the sand, which is forced into the hollow pattern through the openings $e$, and as the pattern advances the curved cutter $d^2$ at the base of the mold-pattern enlarges the cavity formed by the entering cutter, the tool thus forcing its way through the body of the sand until the whole mold and its cope-print are formed. As the pattern advances into the sand the slickers $f$ back of the knives or cutters smooth over the sand and impart to the mold a smooth and almost polished surface by the rapid revolution of the pattern. The mold is also further polished, wherever the sides are perpendicular, or nearly so, by the smooth surface of the pattern, as at $c$, and the rapid revolution of the pattern insures a true cylindrical form to the mold. The sand removed passes through the openings $e$ into the hollow pattern, and can be removed therefrom during the process of cutting, or after the pattern is raised from the mold, by an endless chain and buckets, an air-blast, or other suitable means. It is not necessary that hollow patterns be used for raising the sand, as separate apparatus, such as a worm, may be employed for that purpose.

As the pattern is revolving rapidly when withdrawn from the mold it will not drag on the sides thereof, as is usual in the old styles of molding, and hence is raised without injury to the mold, and for this reason my improved method is especially adapted for the formation of long perpendicular cylindrical molds.

The longitudinal movement of the patterns is regulated by the stops $b$ $b$, and the patterns are raised clear of the molds by the springs $g$. After the formation of one set of molds in the flask it is moved along until fresh sand is brought under the patterns, and the process continued by successive cuts until the flask is filled with molds, the one set of patterns serving to form all the molds necessary, and, on account of the rapidity of the process, accomplishing at least five times the amount of work capable of being accomplished by any other process. The molds thus formed are of true cylindrical shape, perfect in surface and correspondence with the pattern used, and are in no way marred in the withdrawal of the pattern.

In Fig. 6 my invention is illustrated where the pattern enters the solid sand from below. The pattern is mounted in substantially the same manner as shown in Figs. 1 and 2, and is arranged to be raised and lowered through a circular opening, *m*, in the table M. It is raised by a spring and lowered by suitable lever mechanism N, the handle *n* of which extends into a convenient position for its operation by the workman and catches on the ratchet *n'*.

The revolving pattern C is made of a flat plate, as fully shown in Figs. 7 and 8, and the sand removed falls through the opening *m*, and is carried, by the trough or inclined way *m'*, into a suitable receptacle.

The knives or cutters D are formed along the edges of the flat pattern, and back of these knives are formed the slickers *f* for smoothing and polishing the mold, as above described.

The knives and slickers may be adjustable on the flat pattern to form different sizes of molds, as shown at *s*, Fig. 8.

The flask containing the body of packed sand is placed on the table M, either face downward or having suitable openings in the removable bottom board of the flask, through which the cutters work in forming the molds.

In Fig. 9 my invention is illustrated where the pattern enters the mold at the side. The pattern extends through the opening *m* in the table M, and is rotated in this position, it not being necessary for it to be raised and lowered through the table.

Two half-flasks, $K' K^2$, filled with solid packed sand, are arranged to slide on the table in suitable guides *p*, on the sides thereof, and a stop or stops, *r*, checks the movement of the half-flasks when they come to the center of the pattern. The two flasks are moved along the guides *p* against the revolving pattern, which cuts the mold in the solid sand, one-half being thus formed in each half-flask, and the half-flasks are then removed and secured together in the usual way, thus forming the complete mold.

The knives D are arranged on the sides of the pattern so as to cut into the sand when the packed flasks are brought against it. The sand removed falls through the opening *m*, as above described. The pattern can thus be adapted to form molds for articles having rings or enlargements, as the half-flasks are fed sidewise to and withdrawn in the same manner from the revolving pattern.

The patterns can be made to correspond to the different articles to be cast, knives or cutting-edges, with their accompanying slickers, being placed wherever it is necessary for the pattern to cut its way into the sand, as illustrated in the different patterns shown, and by this means any cylindrical mold can be formed in the solid sand where the sides of the mold are perpendicular or tapering, as well as molds having rings or enlargements where half-flasks are used.

By the movement of the flask along the table, or of the revolving pattern along the top of the flask, elongated molds of the shape of the revolving pattern can also be formed.

When the apparatus is mounted in a movable frame the sand may be rolled or otherwise packed on the casting-floor, and the apparatus moved along to form the molds in the sand so packed.

When long flasks are employed they can be placed on cars and brought directly under the cupola-discharge, and the melted metal poured directly from the cupola into the mold, thus doing away with the heavy labor of carrying the metal.

What I claim as my invention, and desire to secure by Letters Patent, is—

1. A revolving pattern adapted to form molds in a solid body of sand, provided with one or more knives or cutters where it cuts its way into the sand, and a slicker back of each cutter, substantially as and for the purposes set forth.

2. A revolving pattern adapted to form molds of an irregular shape in a solid body of sand, provided with an entering-cutter to penetrate and form a cavity in the sand, and one or more cutters above the entering-cutter to enlarge the cavity so formed, substantially as described.

3. A revolving pattern adapted to form molds in a solid body of sand, provided with one or more knives or cutters, D, and a smooth polishing-surface, as at *e*, where the pattern is perpendicular, or nearly so, substantially as and for the purposes set forth.

4. A hollow revolving pattern for forming molds in sand, provided with one or more knives or cutters for removing the sand, and corresponding openings for the passage of the sand into the hollow pattern, substantially as described.

5. A hollow revolving pattern for forming molds in sand, provided with one or more cutters, D, corresponding openings *e*, for the passage of the sand into the pattern, and slickers *f*, back of the cutters, substantially as and for the purposes set forth.

6. The heavy roller L, for packing sand in flasks, provided with the recess *l*, extending across its face, substantially as and for the purposes set forth.

In testimony that I claim the foregoing I have hereunto set my hand this 4th day of January, 1881.

S. JARVIS ADAMS.

Witnesses:
JAMES I. KAY,
F. G. KAY.